US012311618B2

(12) United States Patent
Prause et al.

(10) Patent No.: US 12,311,618 B2
(45) Date of Patent: May 27, 2025

(54) METHODS, DEVICES, AND SYSTEMS FOR FORMING A COMPOSITE STRUCTURE USING AN EXPANDABLE PALLET

(71) Applicant: The Boeing Company, Arlington, VA (US)

(72) Inventors: Richard A. Prause, Arlington, VA (US); Andrew E. Modin, Andrew, VA (US); Allen Halbritter, Arlington, VA (US); Richard E. Heath, Arlington, VA (US); Ivan G. Ramirez, Arlington, VA (US); John R. Nibe, Arlington, VA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/757,235

(22) Filed: Jun. 27, 2024

(65) Prior Publication Data

US 2024/0343002 A1    Oct. 17, 2024

Related U.S. Application Data

(62) Division of application No. 17/697,004, filed on Mar. 17, 2022, now Pat. No. 12,049,050.

(60) Provisional application No. 63/196,361, filed on Jun. 3, 2021.

(51) Int. Cl.
*B29C 70/50* (2006.01)
*B29L 31/00* (2006.01)

(52) U.S. Cl.
CPC ....... *B29C 70/504* (2013.01); *B29L 2031/003* (2013.01)

(58) Field of Classification Search
CPC ..... B29C 70/504; B29C 70/541; B29C 65/56; B29L 2031/003; B29D 99/0003
See application file for complete search history.

(56) References Cited

U.S. PATENT DOCUMENTS

| | | | |
|---|---|---|---|
| 7,513,769 B2 | 4/2009 | Benson et al. | |
| 7,819,651 B2 | 10/2010 | Benson et al. | |
| 8,366,981 B2 | 2/2013 | Benson et al. | |
| 10,525,640 B2 | 1/2020 | Benson et al. | |
| 2006/0231981 A1* | 10/2006 | Lee | B29D 99/0007 264/319 |
| 2010/0024971 A1* | 2/2010 | Benson | B29C 70/30 156/443 |
| 2015/0321444 A1 | 11/2015 | Breu et al. | |
| 2018/0154592 A1 | 6/2018 | Benson et al. | |
| 2018/0339469 A1 | 11/2018 | Stone et al. | |

OTHER PUBLICATIONS

Extended European Search Report prepared by the European Patent Office in application No. EP 22 17 0030.5 dated Oct. 19, 2022.

* cited by examiner

*Primary Examiner* — S. Behrooz Ghorishi
(74) *Attorney, Agent, or Firm* — Walters & Wasylyna LLC (57) ABSTRACT

An example method of forming a composite structure includes applying a laminated charge onto an expandable pallet, moving the expandable pallet in a linear motion relative to a plurality of rollers, and progressively urging the laminated charge into a continuously expanding recess defined by the expandable pallet using the plurality of rollers. The plurality of rollers are oriented in a serial configuration so as to shape the laminated charge into at least part of a shape of the composite structure.

20 Claims, 10 Drawing Sheets

METHODS, DEVICES, AND SYSTEMS FOR FORMING A COMPOSITE STRUCTURE USING AN EXPANDABLE PALLET

CROSS REFERENCE TO RELATED APPLICATION

The present disclosure is a divisional of and claims priority to U.S. application Ser. No. 17/697,004, filed on Mar. 17, 2022, which claims priority to U.S. provisional application No. 63/196,361 filed on Jun. 3, 2021, the entire contents of each of which are herein incorporated by reference.

FIELD

The present disclosure relates generally to systems and methods for forming a composite structure using an expandable pallet, and more particularly to, fabrication of composite components along a continuously moving manufacturing line via use of the expandable pallet using a plurality of rollers to shape the composite structure.

BACKGROUND

Modern aircraft designs use various components, such as stringers, to resist bending, torsional, shear, and direct loads along the fuselage of the aircraft. Stringers are typically formed from lightweight composites comprising, e.g., a tape or a fabric with fibers embedded into a resin matrix. A composite layup is processed using a forming tool to define the stringer shape. However, supporting composite layups in forming tools has been challenging. For example, one approach requires stringer layups to be pre-formed with vertical punch style forming operations and then moved to an assembly line for further processing. A cycle time associated with pre-forming methods limits a speed at which parts can be created. Other approaches require a unique forming tool for each part that needs to be fabricated requiring changing out machine tooling as needed. Still other approaches may only form one ply at a time requiring multiple passes of the forming apparatus to build up a full laminate.

What is needed is a method for fabricating stringers along a continuously moving manufacturing line to enhance efficiency.

SUMMARY

In one example, a method of forming a composite structure is described. The method comprises applying a laminated charge onto an expandable pallet, moving the expandable pallet in a linear motion relative to a plurality of rollers, and progressively urging the laminated charge into a continuously expanding recess defined by the expandable pallet using the plurality of rollers. The plurality of rollers are oriented in a serial configuration so as to shape the laminated charge into at least part of a shape of the composite structure.

In another example, a device for forming a composite structure is described. The device comprises an expandable pallet having a forming surface configured to receive thereon a laminated charge, and a plurality of rollers oriented in a serial configuration for progressively urging the laminated charge into a continuously expanding recess defined by the expandable pallet as the expandable pallet is moved in a linear motion relative to a plurality of rollers. The plurality of rollers shape the laminated charge into at least part of a shape of the composite structure.

In another example, a system for forming a composite structure is described. The system comprises an expandable pallet having a forming surface configured to receive thereon a laminated charge, a plurality of rollers oriented in a serial configuration for progressively urging the laminated charge into a continuously expanding recess defined by the expandable pallet and the plurality of rollers shape the laminated charge into at least part of a shape of the composite structure, and a feed assembly line onto which the expandable pallet with the laminated charge is positioned. The feed assembly line continuously moves the expandable pallet in a linear motion relative to the plurality of rollers.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings.

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, a system and method of forming a composite structure includes applying a laminated charge onto an expandable pallet, moving the expandable pallet in a linear motion relative to a plurality of rollers, and progressively urging the laminated charge into a continuously expanding recess defined by the expandable pallet using the plurality of rollers. The plurality of rollers are oriented in a serial configuration to shape the laminated charge into at least part of a shape of the composite structure.

Figure 1:
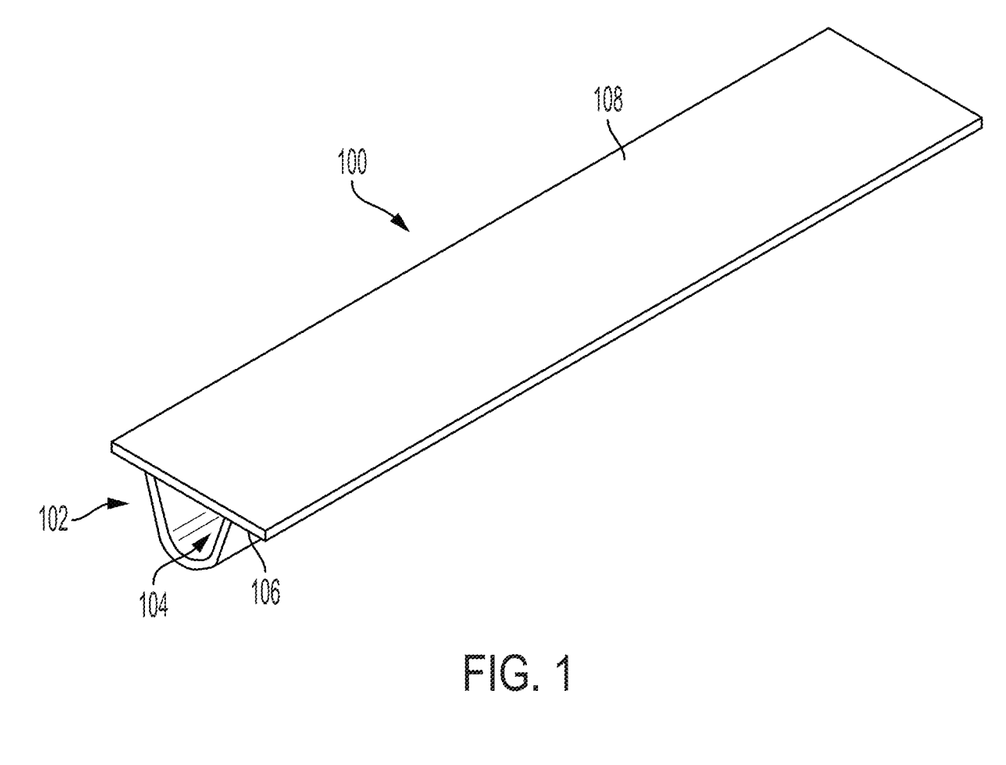
FIG. 1 illustrates an example of a composite structure (e.g., a stringer) having an internal cavity by which a mandrel including an expandable pallet may be used for fabrication, according to an example implementation.

Referring now to the figures, FIG. 1 illustrates an example of a composite structure 100 (e.g., a stringer) having an internal cavity by which a mandrel including an expandable pallet may be used for fabrication, according to an example implementation. In one arrangement, the composite structure 100 may comprise a multi-ply layup of prepreg. In the illustrated arrangement, the composite structure 100 comprises a rounded hat section 102 forming an internal stringer cavity 104, a pair of laterally extending flange sections 106, and a substantially flat skin section 108 that is consolidated together with the flange sections 106 during curing. As those of ordinary skill in the art will recognize, alternative stringer geometries are possible.

After curing, all components shown in FIG. 1 form the composite structure 100. Within examples described herein, the composite structure 100 is fabricated using devices and systems, as described with reference to FIGS. 2-11 and FIGS. 12A-12C, and a bladder is utilized to fill the stringer cavity 104 to create a hollow trapezoidal space in the composite structure 100.

Example composite material used for the composite structure 100 is generally a lightweight material, such as an uncured pre-impregnated reinforcing tape or fabric (i.e., "prepreg"). The tape or fabric can include a plurality of fibers such as graphite fibers that are embedded within a matrix material, such as a polymer, e.g., an epoxy or phenolic. The tape or fabric could be unidirectional or woven depending on a degree of reinforcement desired. Thus, during fabrication, the prepreg tape or fabric is laid onto tooling or molding, components are used to form the tape or fabric into a desired shape of the composite structure 100. The composite structure 100 could be any suitable dimension to provide various degrees of reinforcement, and could comprise any number of plies of prepreg tape or fabric.

Figure 2:
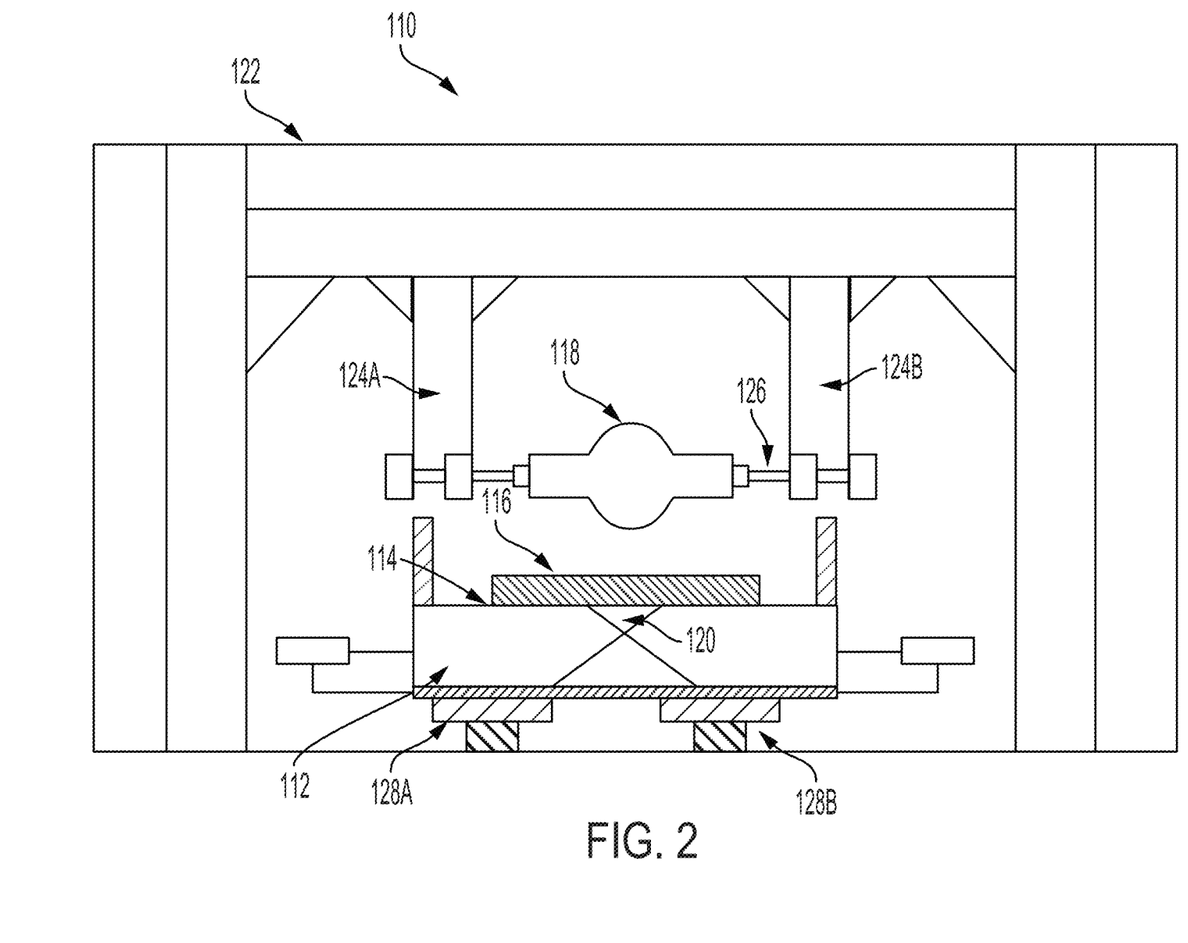
FIG. 2 illustrates an end view of an example of a device for forming the composite structure, according to an example implementation.

FIG. 2 illustrates an end view of an example of a device 110 for forming the composite structure 100, according to an example implementation. The device 110 includes an expandable pallet 112 having a forming surface 114 configured to receive thereon a laminated charge 116, and a plurality of rollers 118 oriented in a serial configuration for progressively urging the laminated charge 116 into a continuously expanding recess 120 defined by the expandable pallet 112 as the expandable pallet 112 is moved in a linear motion relative to a plurality of rollers 118. The plurality of rollers 118 shape the laminated charge 116 into at least part of a shape of the composite structure 100.

In FIG. 2, an end view of the device is shown, and the plurality of rollers 118 are arranged in the serial configuration. As such, the view in FIG. 2 only illustrates a first one of the plurality of rollers 118.

The device 110 also includes a frame 122 with support structures 124a-b holding the plurality of rollers 118. Although the frame 122 is shown overhead of the expandable pallet 112, other configurations are possible as well, such as the frame 122 being mounted on sides of the expandable pallet 112. For example, each roller of the plurality of rollers 118 is installed on a shaft 126 on which the roller rotates. Motion of the plurality of rollers 118 is driven by contact with the laminated charge 116. The plurality of rollers 118 may or may not be motorized or independently driven, but rather, spin passively due to contact with the laminated charge 116 as the laminated charge 116 moves in the linear motion underneath the plurality rollers 118. Thus, the plurality of rollers 118 react to the linear motion of the expandable pallet 112 moving the laminated charge 116 underneath the plurality of rollers 118.

Thus, within examples, the device 110 includes rails 128a-b with bearing trucks driven by a motor connected to the device 110, and the expandable pallet 112 is positioned on top of the rails 128a-b. As the rails 128a-b are driven by the motor causing the bearings to move, similar to a conveyor belt, the expandable pallet 112 is moved in a linear motion underneath the plurality of rollers 118.

Each successive roller of the plurality of rollers 118 is oriented progressively deeper than a preceding roller (based on height above the laminated charge 116), and the plurality of rollers 118 gradually press the laminated charge 116 into the recess 120 such that each successive roller of the plurality of rollers 118 presses the laminated charge 116 deeper into the recess 120. Movement of the expandable pallet 112 underneath the plurality of rollers 118 causes the plurality of rollers 118 to contact the laminated charge 116, for example. Thus, the plurality of rollers 118 gradually press the laminated charge 116 into the recess 120 due to each successive roller of the plurality of rollers 118 pressing the laminated charge deeper into the recess 120 as the expandable pallet 112 carrying the laminated charge 116 moves underneath the plurality of rollers 118. The gradually pressing includes each successive roller of the plurality of rollers 118 contributing to pressing the laminated charge 116 at least some amount deeper into the recess 120 as the expandable pallet 112 moves underneath the plurality of rollers 118. It is gradual in a sense that not one roller punches the laminated charge 116 fully into the recess 120, for example.

Each roller of the plurality of rollers 118 defines a profile complementary to a desired shape of the composite structure 100. In the example shown in FIG. 2, the composite structure 100 is a stringer.

Figure 3:
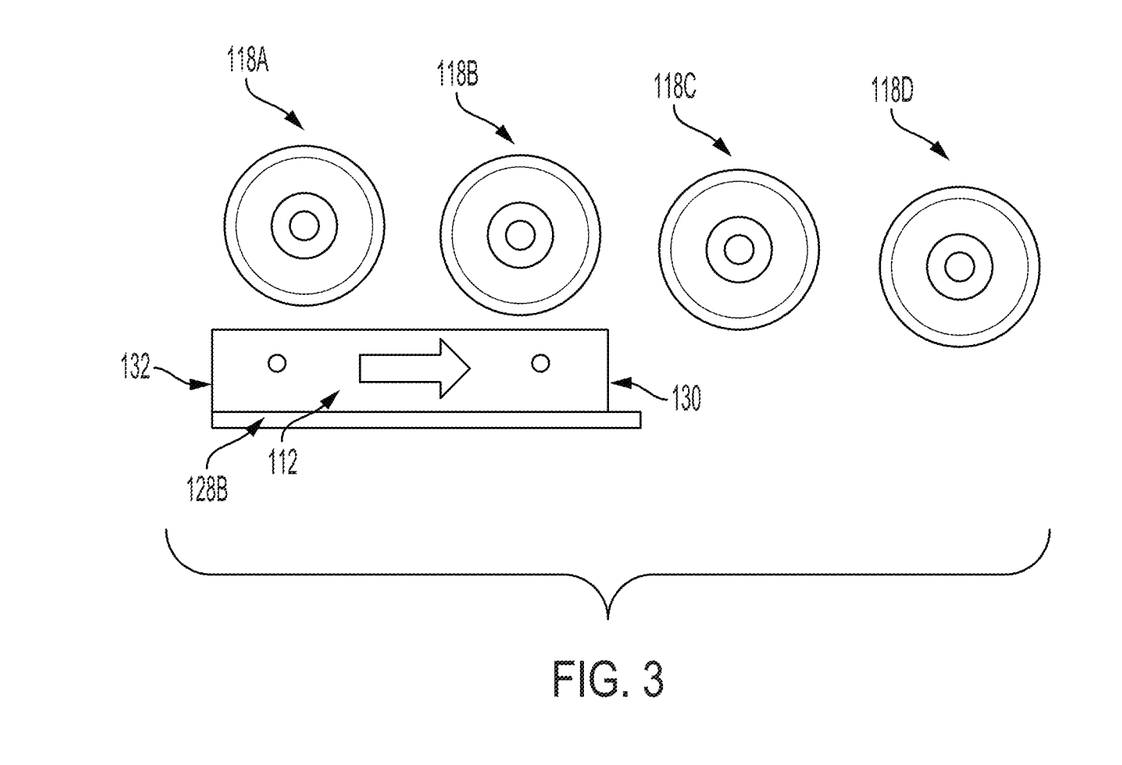
FIG. 3 illustrates a side view of a portion of the device for forming the composite structure, according to an example implementation.
Figure 4:
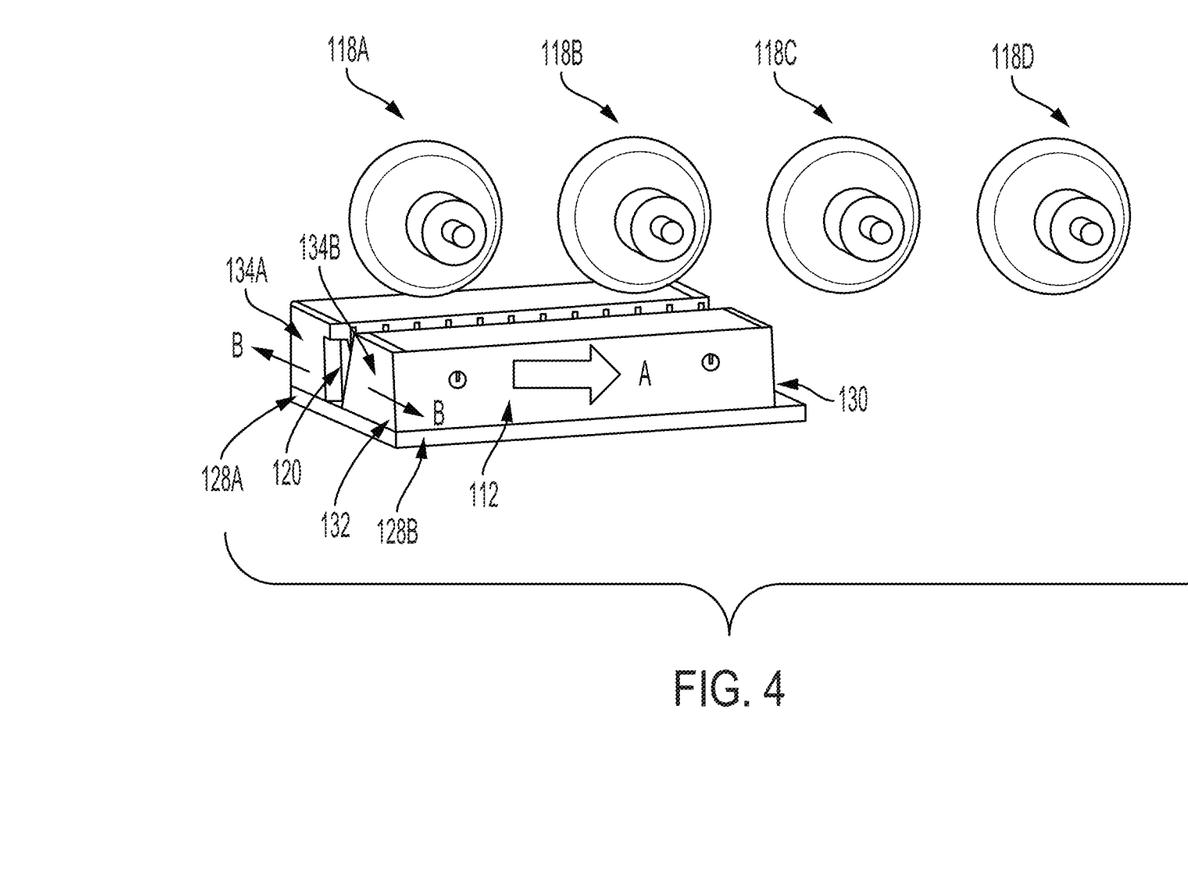
FIG. 4 illustrates a perspective view of the portion of the device for forming the composite structure, according to an example implementation.

FIG. 3 illustrates a side view of a portion of the device 110 for forming the composite structure 100, according to an example implementation. FIG. 4 illustrates a perspective view of the portion of the device 110 for forming the composite structure 100, according to an example implementation. FIGS. 3 and 4 illustrate the expandable pallet 112 and the plurality of rollers 118. In this example, there are four rollers 118a-d, however, more or fewer rollers may be included in the plurality of rollers 118.

In one example, the plurality of rollers 118 are held stationary at respective heights (relational to heights above the laminated charge 116). In the example shown in FIGS. 3-4, a height above the laminated charge 116 for successive rollers decreases from roller 118a to roller 118b, and from roller 118b to roller 118c, and from roller 118c to roller 118d. The expandable pallet 112 moves in the linear motion underneath the plurality of rollers 118 so as to progressively expand from a first end 130 of the expandable pallet 112 to a second end 132 of the expandable pallet 112 opposite the first end 130. The expandable pallet 112 includes a pair of pallet members 134a-b, which are two separate blocks, that slide into and away from each other due to interlocking interior features. In a configuration where the pair of pallet members 134a-b are interlocked together, the recess 120 is a small area as shown in FIG. 2. Thus, the pair of pallet members 134a-b interlocked with one another define the recess 120 therebetween. As the pair of pallet members 134a-b slide apart, the recess 120 grows larger. Thus, the pair of pallet members 134a-b are movable and translate relative to one another for modifying a size and configuration of the recess 120.

The expandable pallet 112 moves in a linear motion due to the rails 128a-b in a direction shown by an arrow labeled "A" in FIGS. 3-4 to the right, and as the expandable pallet 112 moves, the laminated charge 116 (not shown in FIGS. 3-4) is progressively urged into the recess 120 that is continuously expanding by the plurality of rollers 118. The plurality of rollers 118 urge the laminated charge 116 into the recess 120 causing the expandable pallet 112 to expand in a direction substantially perpendicular to the linear motion. In FIGS. 3-4, the expandable pallet 112 expands in a direction shown by arrows labeled "B". The plurality of rollers 118 urge the laminated charge 116 into the continuously expanding recess 120 causing the pair of pallet members 134a-b to move outward relative to one another and continuously expand the recess 120.

The plurality of rollers 118 are oriented in a wedging configuration for progressively forming a shape of the composite structure 100, specifically a desired shape of a hat portion of the stringer. In other words, each roller of the plurality of rollers 118 is progressively deeper than a preceding roller such that the plurality of rollers 118 gradually press into the recess 120, urging the pair of pallet members 134a-b away from one another until the desired shape is created by the last roller 118d as the expandable pallet 112 passes thereunder. As mentioned, the plurality of rollers 118 define a profile, which is complementary to the desired shape of the hat portion of the stringer, for example.

The expandable pallet 112 opens slowly by the pair of pallet members 134a-b sliding apart as the expandable pallet 112 moves in the linear motion underneath the plurality of rollers 118. For example, the expandable pallet 112 progressively opens from the first end 130 to the second end 132 as the expandable pallet 112 travels underneath the plurality of rollers 118. A force required to open the pair of pallet members 134a-b is adjustable with compressed air and air cylinders of the device 110, for example.

In another example, the plurality of rollers 118 are arranged to move in a vertical direction (e.g., perpendicular to the linear motion of the expandable pallet 112). In one example, the vertical movement is controlled passively with a spring or air cylinder coupled to the plurality of rollers 118. In another example, the vertical movement is controlled actively by an electro motor. The vertical movement assist with and accommodates to changes in laminate thickness (e.g., ply drops).

Figure 5:
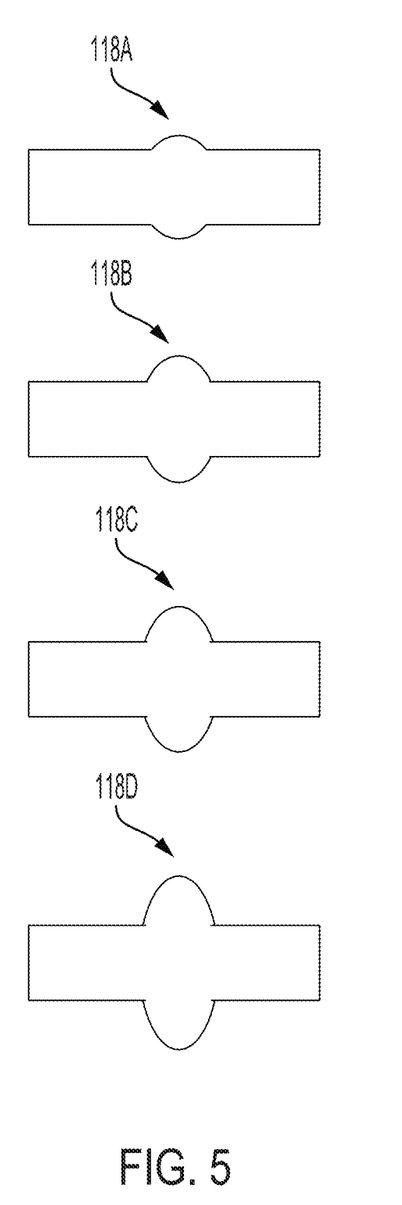
FIG. 5 illustrates a perspective view of another example configuration of the plurality of rollers, according to an example implementation.

FIG. 5 illustrates a perspective view of another example configuration of the plurality of rollers 118, according to an example implementation. In FIG. 5, the plurality of rollers 118A-D are arranged such that subsequent rollers have alternate shapes, such as progressively deeper roller shapes to further assist with each subsequent roller maintaining contact with the laminated charge 116, for example. FIG. 5 conceptually illustrates arrangement of the plurality of rollers 118A-D in a serial configuration to demonstrate the progressively deeper shapes.

Figure 6:
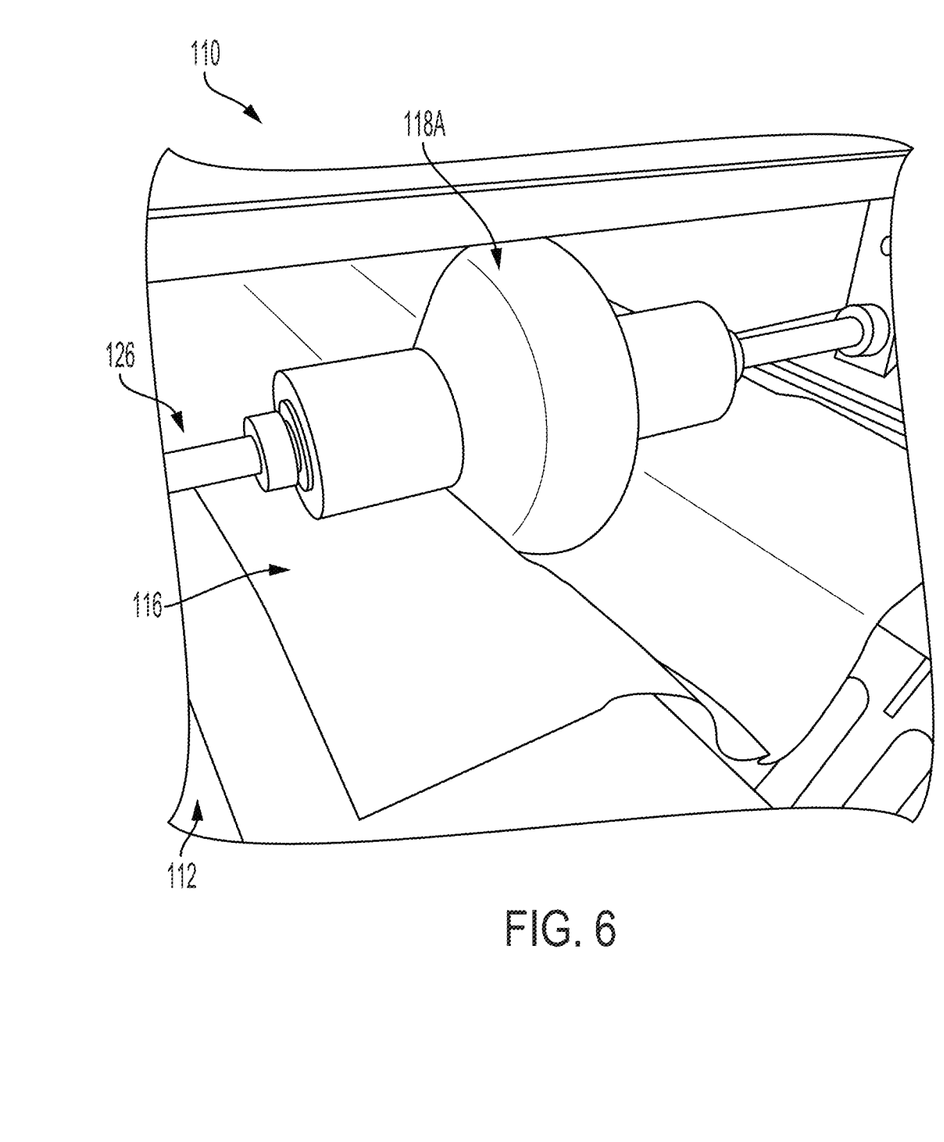
FIG. 6 illustrates a perspective view of a portion of an alternate configuration of the device for forming the composite structure, according to an example implementation.

FIG. 6 illustrates a perspective view of a portion of an alternate configuration of the device 110 for forming the composite structure 100, according to an example implementation. In FIG. 6, the device 110 is shown with a single roller 118a. In the example configuration shown in FIG. 6, the laminated charge 116 includes a multi-ply fabric stringer that is formed by passing the expandable pallet 112 underneath the roller 118a multiples cycles, such as about ten to fifteen cycles. For each subsequent cycle, the roller 118a is lowered to simulate a multi-roller device with a desired pitch depth between rollers.

In other examples, alternate depths are used depending on the size and shape of the composite structure 100 being fabricated. Further, a different shaped roller can be used too, other than a wedge shape as shown in FIG. 6, to create alternate shaped structures. Still further, a number of rollers used can vary as well. Yet, still further, a different combination of rollers can be used, such as rollers with same diameters and varying heights above the expandable pallet 112 or rollers held at a same height above the expandable pallet 112 but with different or varying diameter or geometry. Examples of different configurations of the device 110 include the plurality of rollers 118 each about 50-100 thousandths of an inch deeper to create about a 1-2 inch tall stringer using twenty to thirty rollers, the and plurality of rollers 118 being flat with each roller slightly deeper than a previous roller to simulate a punch into the expandable pallet 112. Other example configurations of the device 110 using different combinations of number of the plurality of rollers 118, depth of the plurality of rollers 118, and shape of the plurality of rollers 118 are possible as well.

Figure 7:
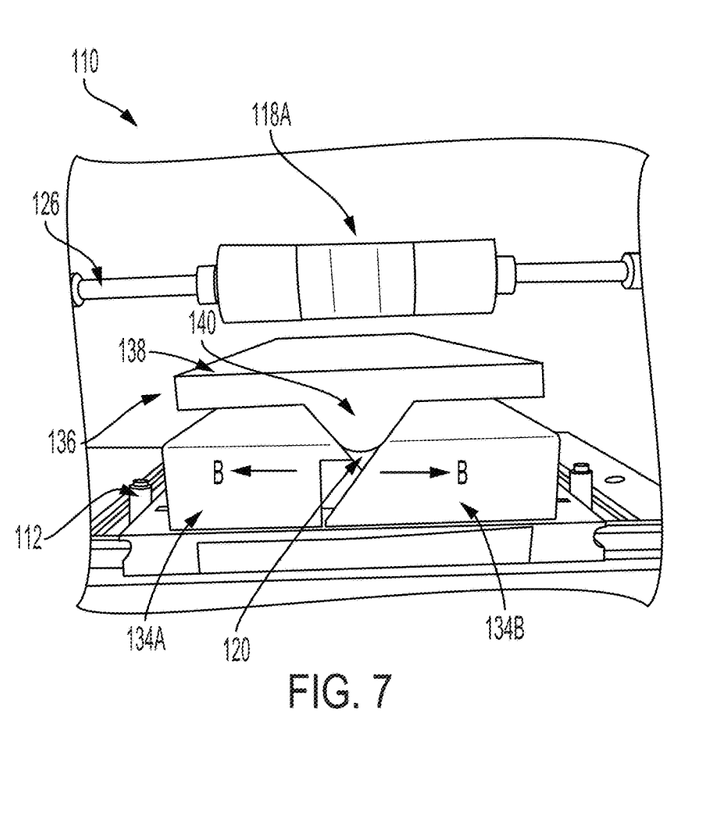
FIG. 7 illustrates an end perspective view of a portion of the device in which a forming block is used for forming the composite structure, according to an example implementation.
Figure 8:
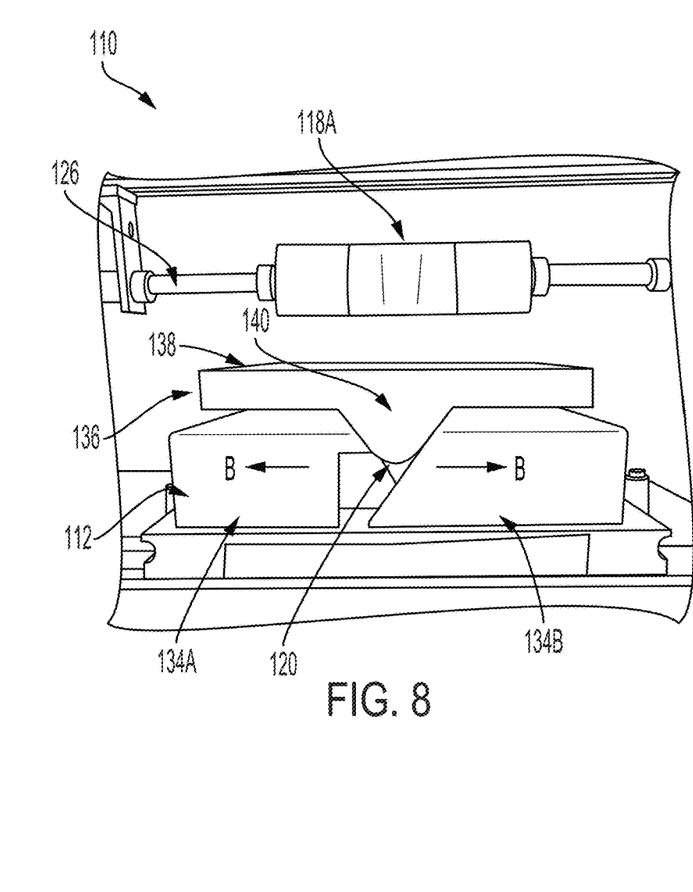
FIG. 8 illustrates another end perspective view of a portion of the device in which a forming block is used for forming the composite structure, according to an example implementation.
Figure 9:
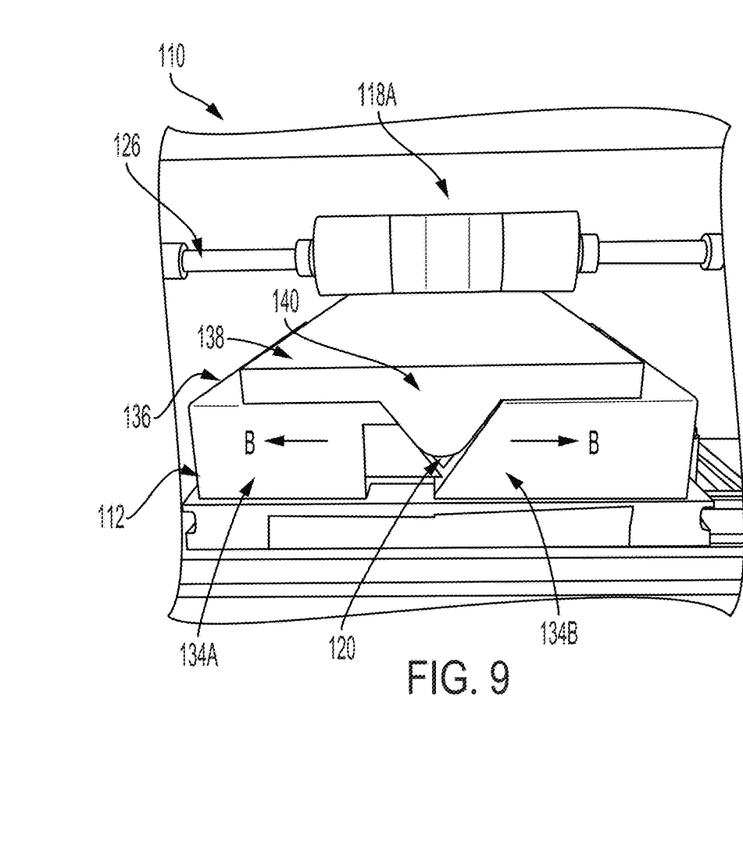
FIG. 9 illustrates another end perspective view of a portion of the device in which a forming block is used for forming the composite structure, according to an example implementation.

FIGS. 7-9 illustrate an end perspective view of a portion of the device 110 in which a forming block 136 is used for forming the composite structure 100, according to an example implementation.

In FIG. 7, after applying the laminated charge 116 (not shown) onto the expandable pallet 112, the forming block 136 is applied over the laminated charge 116, and the forming block includes a base 138 and a protrusion 140 extending from the base 138 that defines a profile complementary to a desired shape of the composite structure 100. In operation, the expandable pallet 112 is then passed underneath the plurality of rollers 118 to progressively press the forming block 136 downward thereby continuously expanding the recess 120 and urging the laminated charge 116 into the recess 120.

FIG. 7 illustrates a first stage of the pressing in which the protrusion 140 of the forming block 136 enters the recess 120. FIG. 8 illustrates a second stage, subsequent to pressing the forming block 136 by the plurality of rollers 118, in which the forming block 136 moves further downward and pushes the pair of pallet members 134a-b outward causing the recess 120 to enlarge. FIG. 9 illustrates a third stage, subsequent to the second stage in which the forming block 136 is further pressed downward and pushes the pair of pallet members 134a-b further outward causing the recess 120 to enlarge.

Figure 10:
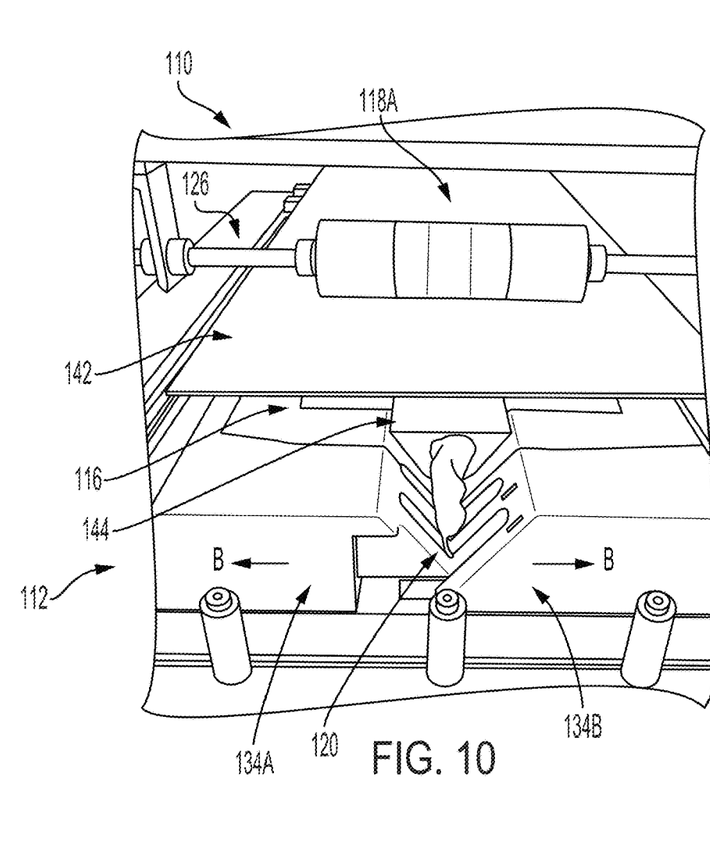
FIG. 10 illustrates an end perspective view of a portion of the device in which an alternate configuration of the forming block is used for forming the composite structure, according to an example implementation.

FIG. 10 illustrates an end perspective view of a portion of the device 110 in which an alternate configuration of the forming block 136 is used for forming the composite structure 100, according to an example implementation. In some examples, the forming block 136 is further defined as a flat plate 142 and a bladder 144 (e.g., stiffened bladder or a cureable tooling bladder), and the bladder 144 is progressively urged toward the expanding pallet 112 for forming the composite structure 100. The plurality of rollers 118 in this example may define a flat, cylindrical profile, and do not directly engage the laminated charge 116. Any shape can be used for the plurality of rollers 118 because the bladder 144 is pressed into the laminated charge 116 and creates the desired shape of the composite structure 100.

In some examples, after fabricating the composite structure 100, the composite structure 100 is be crated off-line and then fed into a forming station for further processing. At this stage, the composite structure 100 is pre-formed and additional steps of bladder installation, noodle extrusion, compaction, and curing are performed. Thus, in some examples for fabrication, the composite structure 100 remains in distinct production areas while waiting to move to a next stage of production.

In other examples, a system is leveraged for high-rate stringer fabrication along a continuously moving manufacturing line to produce a number of composite structures continuously, such as about a few per minute. Each of the composite structures may include a desired length stringer package ready for curing.

Figure 11:
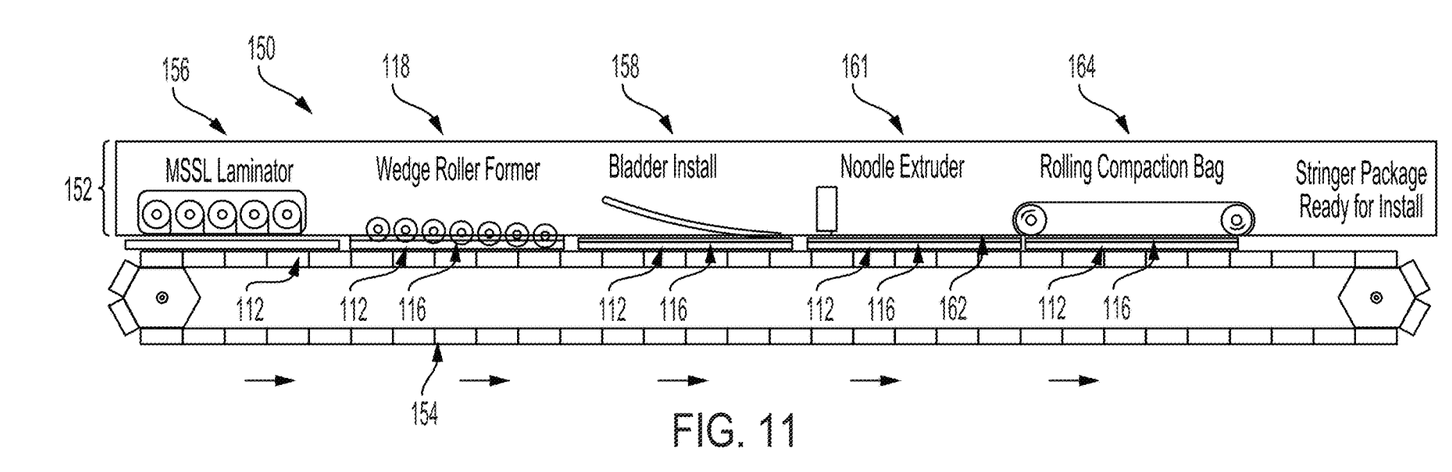
FIG. 11 illustrates a side conceptual view of a system for forming the composite structure, according to an example implementation.

FIG. 11 illustrates a side conceptual view of a system 150 for forming the composite structure 100, according to an example implementation. The system 150 includes an expandable pallet 112 having the forming surface 114 configured to receive thereon the laminated charge 116, the plurality of rollers 118 oriented in a serial configuration for progressively urging the laminated charge 116 into a continuously expanding recess 120 defined by the expandable pallet 112 and the plurality of rollers 118 shape the laminated charge 116 into at least part of a shape of the composite structure 100, and a feed assembly line 152 onto which the expandable pallet 112 with the laminated charge 116 is positioned and the feed assembly line 152 continuously moves the expandable pallet 112 in a linear motion relative to the plurality of rollers 118.

The feed assembly line 152 includes a number of different stations for fabricating and then post-processing of the laminated charge 116 to create the composite structure 100. Each of the different stations resides over a portion of a conveyor belt 154 that moves the expandable pallet 112 in the linear motion relative to each station.

A first station includes a laminator 156 that applies a full set of plies at once onto the expandable pallet 112. The full set of plies is the laminated charge 116.

The conveyor belt 154 moves the expandable pallet 112 in a linear motion (as shown in FIG. 10 by the arrows to the right), driven by a motor, and progresses the expandable pallet 112 now with the laminated charge 116 positioned thereon to the next station that includes the plurality of rollers 118. As described, the plurality of rollers 118 progressively urge the laminated charge 116 into the recess 120 of the expandable pallet 112.

The conveyor belt 154 continues to move the expandable pallet 112 in a linear motion (as shown in FIG. 11 by the arrows to the right) and progresses the expandable pallet 112 now with the laminated charge 116 urged into the recess 120 to the next station that includes a bladder station 158. The bladder station 158 is positioned after the plurality of rollers 118 within the feed assembly line 152, and as the expandable pallet 112 moves past the bladder station 158, the bladder 144 is applied onto the laminated charge 116 into a cavity 160 formed by the plurality of rollers 118.

Figure 12A:
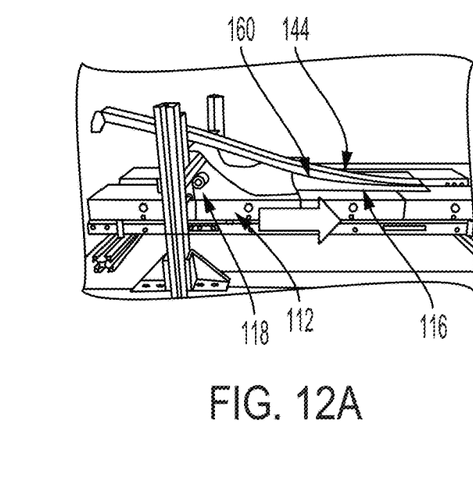
FIG. 12A illustrates an example of a first sequence of installation of the bladder in the bladder station, according to an example implementation.
Figure 12B:
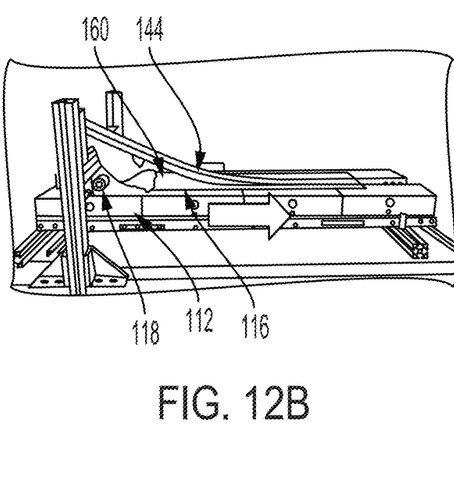
FIG. 12B illustrates an example of a second sequence of installation of the bladder in the bladder station, according to an example implementation.
Figure 12C:
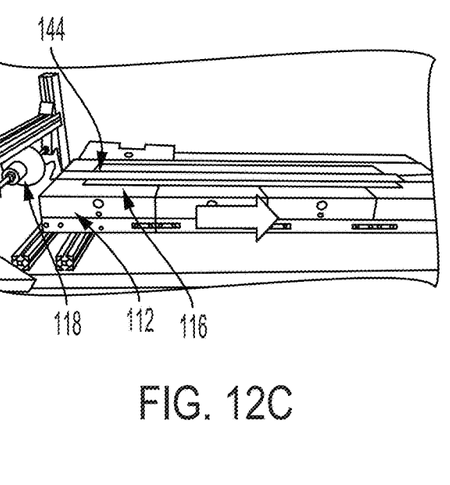
FIG. 12C illustrates an example of a third sequence of installation of the bladder in the bladder station, according to an example implementation.

FIGS. 12A-12C illustrate an example sequence of installation of the bladder 144 in the bladder station 158, according to an example implementation. As shown in FIG. 12A, the bladder 144 is laid within the cavity 160 in a lengthwise manner starting on a right side that exits the plurality of rollers 118. As the expandable pallet 112 moves in the linear motion to the right, as indicated by the arrows in FIGS. 12A-12C, the bladder 144 is further inserted into the cavity 160. In one example, the bladder 144 is manually inserted into the cavity 160. In other examples, machinery (not shown) is used to insert the bladder 144 into the cavity 160.

FIG. 12B illustrates the bladder 144 further inserted into the cavity 160 as the expandable pallet 112 continues to move through the bladder station 158. FIG. 12C illustrates the bladder 144 fully installed into the cavity 160 at an end of the bladder station 158. As seen in FIGS. 12A-12C, the expandable pallet 112 is continuously moved through the feed assembly line 152 and a portion of the expandable pallet 112 may be underneath the plurality of rollers 118 while another portion of the expandable pallet 112 has entered the bladder station 158.

Referring back to FIG. 11, the conveyor belt 154 continues to move the expandable pallet 112 in a linear motion (as shown in FIG. 11 by the arrows to the right) and progresses the expandable pallet 112 now with the bladder 144 installed to the next station that includes a radius filler station 161 that is positioned after the bladder station 158 within the feed assembly line 152. As the expandable pallet 112 moves past the radius filler station 161, a radius filler 162 is installed into the laminated charge 116.

Gaps or void regions can be formed by a radius of any curved pieces of the laminated charge. Such gaps or void regions are typically referred to as "radius filler regions" or "noodle regions". The radius filler station fills the radius filler regions or noodle regions with radius filler elements or "noodles" made of composite material or adhesive/epoxy material and having a generally triangular cross-section to provide additional structural reinforcement to such regions. The radius filler 162 includes carbon fiber-reinforced plastic (CFRP) that is placed by machinery into the gaps or voids as the expandable pallet 112 moves through the radius filler station 161.

The conveyor belt 154 continues to move the expandable pallet 112 in a linear motion (as shown in FIG. 11 by the arrows to the right) and progresses the expandable pallet 112 now with the radius filler 162 installed to the next station that includes a compaction station 164 that is positioned after the radius filler station 161 within the feed assembly line 152. As the expandable pallet 112 moves through the compaction station 164, the laminated charge 116 is compacted into a completed package.

Thus, the system 150 operates the feed assembly line 152 by continuously moving the expandable pallet 112 in the linear motion enabling fabrication of composite structures at a rate of about multiple feet per minute. The continuously moving assembly line enables a substantial increase in a rate of production and manufacturing efficiency of composite stiffeners because there is no stopping for alternate tooling to be placed.

In an alternate example in which the forming block 136 is used that includes the flat plate 142 and the bladder 144, the bladder station 158 is re-ordered to be positioned in the feed assembly line 152 before the plurality of rollers 118.

Figure 13:
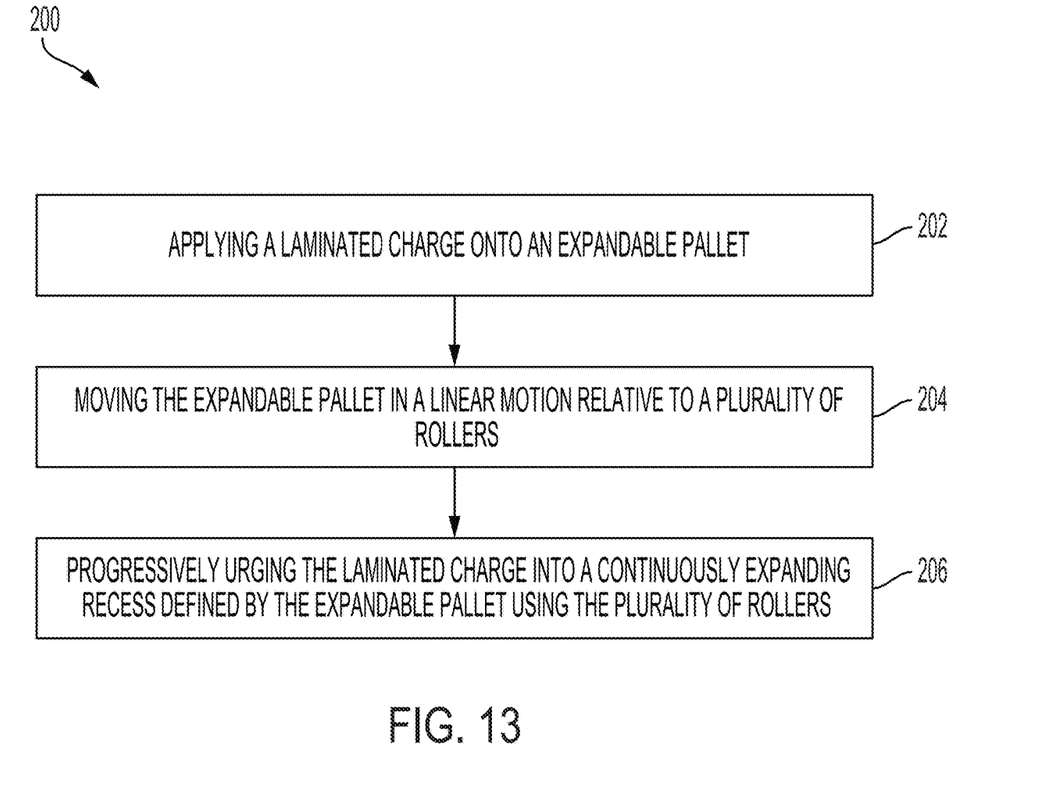
FIG. 13 is a flowchart illustrating an example of a method of forming a composite structure, according to an example implementation.

FIG. 13 is a flowchart illustrating an example of a method 200 of forming a composite structure, according to an example implementation. Method 200 shown in FIG. 13 presents an example of a method that could be used with the device 110 shown throughout the Figures or with the system 150 shown in FIG. 10, for example. Further, devices or systems may be used or configured to perform logical functions presented in FIG. 13. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-206. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Within examples, one or more blocks of the method 200 may be represented in program code or circuitry used for controlling robotic mechanisms for performing functions related to forming the composite structure. While at least some portions of the method 200 and variations thereof may be executed automatically using, for example, one or more robotic armatures controlled by program code operating in accordance with the method 200, some tasks may also or alternatively be performed manually. Thus, within examples, certain functionality described with respect to the method 200 may be performed automatically while other portions can be performed manually. Alternatively, all blocks of the method 200 may be performed automatically or all blocks of the method 200 may be performed manually.

In this regard, for blocks or portions of blocks that represent a module, a segment, or a portion of program code, such functionality includes one or more instructions executable by a processor for implementing specific logical functions or steps in the process that are carried out by machinery or devices. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, some blocks or portions of blocks in FIG. 13, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes applying the laminated charge 116 onto the expandable pallet 112.

At block 202, the method 200 includes moving the expandable pallet 112 in a linear motion relative to the plurality of rollers 118. Within examples, a roller of the plurality of rollers 118 defines a profile complementary to a desired shape of the composite structure 100. Further, in one example, the composite structure 100 is a stringer.

At block 202, the method 200 includes progressively urging the laminated charge 116 into a continuously expanding recess 120 defined by the expandable pallet 112 using the plurality of rollers 118, and the plurality of rollers 118 are oriented in a serial configuration so as to shape the laminated charge 116 into at least part of a shape of the composite structure 100.

In one example, each successive roller of the plurality of rollers 118 is oriented progressively deeper than a preceding roller, and progressively urging the laminated charge 116 into the continuously expanding recess 120 defined by the expandable pallet using the plurality of rollers 118 includes gradually pressing the laminated charge 116 into the recess 120 by the plurality of rollers 118 and each successive roller of the plurality of rollers 118 presses the laminated charge 116 deeper into the recess 120.

In one example, moving the expandable pallet 112 in the linear motion relative to the plurality of rollers 118 and progressively urging the laminated charge 116 into the continuously expanding recess 120 defined by the expandable pallet 112 using the plurality of rollers 118 includes progressively expanding the expandable pallet 112 from a first end 130 to a second end 132 opposite the first end 130.

In one example, the expandable pallet 112 includes a pair of pallet members 134*a*-*b* interlocked with one another defining the recess 120 therebetween, and progressively urging the laminated charge 116 into the continuously expanding recess 120 defined by the expandable pallet 112 includes the plurality of rollers 118 urging the laminated charge 116 into the continuously expanding recess 120 causing the pair of pallet members 134*a*-*b* to move outward relative to one another and continuously expand the recess 120.

In one example, the plurality of rollers 118 are held stationary at respective heights, and the method 200 further includes moving the expandable pallet 112 in the linear motion underneath the plurality of rollers 118. Additional functions of the method 200 also may include the plurality of rollers 118 urging the laminated charge 116 into the continuously expanding recess 120 causing the expandable pallet 112 to expand in a direction substantially perpendicular to the linear motion.

In some examples, the method 200 optionally includes after progressively urging the laminated charge 116 into the continuously expanding recess 120 defined by the expandable pallet 112 using the plurality of rollers 118, applying a bladder 144 onto the laminated charge 116 into a cavity 160 formed by the plurality of rollers 118. In addition, the method 200 may optionally include after applying the bladder 144 onto the laminated charge 116, installing radius filler 162 into the laminated charge 116. In addition, the method 200 may optionally after installing the radius filler 162 into the laminated charge 116, compacting the laminated charge 116. In these examples, applying the laminated charge 116 onto the expandable pallet 112, progressively urging the laminated charge 116 into the continuously expanding recess 120 defined by the expandable pallet 112 using the plurality of rollers 118, applying the bladder 144 onto the laminated charge 116, installing the radius filler 162 into the laminated charge 116, and compacting the laminated charge 116 are performed along a feed assembly line 152 by continuously moving the expandable pallet 112 in the linear motion.

In some examples, the method 200 optionally includes after applying the laminated charge 116 onto the expandable pallet 112, applying a forming block 136 over the laminated charge 116, and the forming block 136 comprises a base 138 and a protrusion 140 extending from the base 138 that defines a profile complementary to a desired shape of the composite structure 100. In this example, progressively urging the laminated charge 116 into the continuously expanding recess 120 defined by the expandable pallet 112 using the plurality of rollers 118 includes progressively pressing the forming block 136 downward thereby continuously expanding the recess 120 and urging the laminated charge 116 into the recess 120.

Example devices, systems, and methods described herein support fabrication of composite structures along a continuously moving manufacturing line, which significantly enhances efficiency, reduces time to form the composite structures, and reduces space required for fabrication. Altogether, a cost reduction in composite structure fabrication is also achievable with the example devices, systems, and methods described herein.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A device for forming a composite structure, the device comprising:
   an expandable pallet having a forming surface configured to receive thereon a laminated charge; and
   a plurality of rollers oriented in a serial configuration for progressively urging the laminated charge into a continuously expanding recess defined by the expandable pallet as the expandable pallet is moved in a linear motion relative to a plurality of rollers, wherein the plurality of rollers shape the laminated charge into at least part of a shape of the composite structure,
   wherein each successive roller of the plurality of rollers is oriented progressively deeper than a preceding roller, and the plurality of rollers gradually press the laminated charge into the recess so that each successive roller of the plurality of rollers presses the laminated charge deeper into the recess.

2. The device of claim 1, wherein the plurality of rollers are held stationary at respective heights, and the expandable pallet moves in the linear motion underneath the plurality of rollers so as to progressively expand from a first end of the expandable pallet to a second end of the expandable pallet opposite the first end.

3. The device of claim 1, wherein the plurality of rollers are held stationary at respective heights above the laminated charge, wherein each successive roller of the plurality of rollers is oriented at a different height than a preceding roller and the different height above the laminated charge decreases.

4. The device of claim 1, wherein a roller of the plurality of rollers defines a profile complementary to a desired shape of the composite structure.

5. The device of claim 1, wherein the composite structure is a stringer.

6. The device of claim 1, wherein the plurality of rollers urging the laminated charge into the continuously expanding recess causes the expandable pallet to expand in a direction substantially perpendicular to the linear motion.

7. The device of claim 1, wherein the plurality of rollers urging the laminated charge into the continuously expanding recess causes the expandable pallet to expand from a first end to a second end opposite the first end.

8. The device of claim 1, wherein the expandable pallet includes a pair of pallet members interlocked with one another defining the recess therebetween.

9. The device of claim 8, wherein the plurality of rollers urging the laminated charge into the continuously expanding recess causes the pair of pallet members to move outward relative to one another and continuously expand the recess.

10. The device of claim 1, further comprising:
    a bladder applied onto the laminated charge into a cavity formed by the plurality of rollers.

11. The method of claim 10, further comprising:
    a radius filler installed into the laminated charge after applying the bladder onto the laminated charge.

12. The device of claim 1, further comprising:
    a conveyor belt, onto which the expandable pallet is positioned, driven by a motor to move the expandable pallet in the linear motion.

13. The device of claim 12, wherein the conveyor belt continuously moves the expandable pallet through a feed assembly line.

14. The device of claim 1, wherein the plurality of rollers have different geometries.

15. The device of claim 1, wherein the plurality of rollers have varying diameters.

16. The device of claim 1, wherein the plurality of rollers are held stationary based on being installed on respective shafts, wherein each successive roller of the plurality of rollers is oriented at the different height than the preceding roller based on the respective shafts being at the different height.

17. The device of claim 1, wherein the plurality of rollers are held stationary based on being installed on respective shafts, wherein each successive shaft of the plurality of rollers is oriented at the different height than the preceding roller and the different height above the laminated charge decreases.

18. A system for forming a composite structure, the system comprising:
- an expandable pallet having a forming surface configured to receive thereon a laminated charge;
- a plurality of rollers oriented in a serial configuration for progressively urging the laminated charge into a continuously expanding recess defined by the expandable pallet, wherein the plurality of rollers shape the laminated charge into at least part of a shape of the composite structure, wherein each successive roller of the plurality of rollers is oriented progressively deeper than a preceding roller, and the plurality of rollers gradually press the laminated charge into the recess so that each successive roller of the plurality of rollers presses the laminated charge deeper into the recess; and
- a feed assembly line onto which the expandable pallet with the laminated charge is positioned, wherein the feed assembly line continuously moves the expandable pallet in a linear motion relative to the plurality of rollers.

19. The system of claim 18, further comprising:
a bladder station positioned after the plurality of rollers within the feed assembly line, wherein as the expandable pallet moves past the bladder station, a bladder is applied onto the laminated charge into a cavity formed by the plurality of rollers.

20. The system of claim 19, further comprising:
a radius filler station positioned after the bladder station within the feed assembly line, wherein as the expandable pallet moves past the radius filler station, a radius filler is installed into the laminated charge.

* * * * *